United States Patent [19]

Ehmer et al.

[11] Patent Number: 5,452,947
[45] Date of Patent: Sep. 26, 1995

[54] CIRCUIT CONFIGURATION FOR REGULATING THE BRAKE PRESSURE BUILD-UP FOR A BRAKE SYSTEM COMPRISING AN ANTI-LOCKING CONTROL

[75] Inventors: Norbert Ehmer, Bad Orb; Thomas Striegel, Liederbach, both of Germany

[73] Assignee: IIT Automotive Europe GmbH, Frankfurt, Germany

[21] Appl. No.: 142,314

[22] PCT Filed: Feb. 14, 1992

[86] PCT No.: PCT/EP92/00319
§ 371 Date: Nov. 17, 1993
§ 102(e) Date: Nov. 17, 1993

[87] PCT Pub. No.: WO92/20555
PCT Pub. Date: Nov. 26, 1992

[30] Foreign Application Priority Data

May 18, 1991 [DE] Germany ............ 41 16 373.7

[51] Int. Cl.⁶ .................................. B60T 8/32
[52] U.S. Cl. .............. 303/150; 303/170; 364/426.02
[58] Field of Search ............... 303/103, 111, 303/100, 106, 95, 96; 364/426.02, 426.03; 180/197

[56] References Cited

U.S. PATENT DOCUMENTS 5,029,949  7/1991  Buschmann et al. ............ 303/96
5,043,898  8/1991  Yoshino ......................... 303/95 X

FOREIGN PATENT DOCUMENTS 0261783  3/1988  European Pat. Off. .
0329071  8/1989  European Pat. Off. .
2430874  2/1980  France .
3840564  3/1990  Germany .
3838536  5/1990  Germany .
3903180  8/1990  Germany .
91/05687  5/1991  WIPO .

Primary Examiner—Robert J. Oberleitner
Assistant Examiner—Peter M. Poon
Attorney, Agent, or Firm—Ratner & Prestia

[57] ABSTRACT

A circuit configuration for a brake system comprising an anti-locking control is furnished with circuits which: (1) at a low friction coefficient on either vehicle side, individually control the brake pressure on the rear wheel brakes upon commencement of a control process, (2) after the first entrance of a rear wheel into a stable phase switch to "select-low", and (3) in the select-low control phased if during a predetermined period of time no instability occurs on the non-selected rear wheel, increase the brake pressure on the non-selected wheel in the next pressure build-up phase by a fixed or variable amount. According to a first embodiment, the brake pressure is delivered prematurely into a wheel brake of the rear wheel if the wheel speed falls below a slip threshold if, at the same time, the factual reacceleration is above a threshold value and if another value derived from the maximum value of the filtered wheel acceleration is exceeded.

27 Claims, 3 Drawing Sheets

$L_{out} = L_{in} + VAR + CNT$

CIRCUIT CONFIGURATION FOR REGULATING THE BRAKE PRESSURE BUILD-UP FOR A BRAKE SYSTEM COMPRISING AN ANTI-LOCKING CONTROL

BACKGROUND OF THE INVENTION

The present invention relates to a circuit configuration for a brake system of automotive vehicles comprising an anti-locking control and serving for regulating the brake pressure build-up on the rear wheels during a controlled braking operation, with the aid of which, through a logical operation of signals mirroring the rotating pattern of the individual wheels and/or the driving pattern of the automotive vehicle, the coefficient of friction is permanently determined and the brake pressure on the rear wheels in "normal operation" is regulated according to the select-low control principle.

The accuracy of the control of the brake pressure in response to the rotating pattern of the wheels and the driving pattern of the automotive vehicle during a controlled braking operation will determine the quality and efficiency of an anti-locking system. The time and the amount of the brake pressure delivery are to be so selected as to reliably insure, that, on the one hand, the driving stability and the steering ability of the automotive vehicle at no time are affected which, in the first place, is attainable by a reduction in the brake pressure while, on the other hand, a short stopping distance is achieved. A high skill on the part of the developer is required to satisfy these actually contradictory requirements.

DE-3903180 A1 discloses a circuit configuration according to which the pressure build-up in the individual cycles, during a control, is dependent on the pressure build-up in the preceding cycle, with a distinction being made between a build-up of a steep gradient and a build-up of a flat gradient, and on the duration of the preceding pressure decrease.

The brake pressure on the front wheels, generally, is controlled individually. With respect to the control of the brake pressure on the rear wheels, in the majority of cases, the select-low control principle, generally, is the one which is preferred. According to that method, an identical brake pressure prevails in the rear wheel brakes, the amount and pattern of which is directed by the "low-wheel" while on the "high-wheel" in a control of that type, the brake pressure, in a large number of cases, is lower than theoretically possible which, necessarily, results in a more or less significant extension of the stopping distance. However, the wheel braked at an excessively low rate, (i.e. the high-wheel), substantially contributes to the driving stability.

In the event of a homogeneous friction coefficient, (i.e. with a friction coefficient identical on the right-hand and left-hand sides of the vehicle), and at an approximately identical brake characteristic or an identical dependence of the brake effect of the two rear wheels on the brake pressure, substantially no extension of the stopping distance will occur due to the select-low control. With disc brakes, the characteristics are adequately identical and linear but not necessarily so with drum brakes. In automotive vehicles with a different locking pressure level on the rear axle, which is due, for example, to the use of drum brakes of different contact pressures, to different friction coefficients of the brake pads (which will, of course, also apply to disc brakes), etc., which, virtually, will result, with an identical brake pressure, in different wheel brake torques, a select-low control will permit the theoretically possible brake effect or brake force utilization on one wheel only. The other wheel will not contribute nearly enough to the braking effect. This is especially disadvantageous and no longer acceptable in situations where the brake force share of the rear wheels, compared to the individually controlled front wheels, is or could be high; this especially applies to roads having a low friction coefficient.

According to DE 3815732 A1, in general, in an automotive vehicle having a select-low control on the rear axle, the rotating patterns of the rear wheels are compared during the control and, after criteria have been recognized that are typical for a continual brake torque difference on the rear wheels, a brake pressure adjustment is performed and, hence, an adjustment of the brake torque.

SUMMARY OF THE INVENTION

It is, therefore, an objective of the present invention to provide a circuit configuration for overcoming the disadvantages of the prior art described above, which also, when using rear wheel brakes having very different characteristics, such as drum brakes, or under different friction coefficients and similar situations, permits use of the select-low control principle which is advantageous for the driving stability and which, at the same time, largely exhausts the theoretically possible contribution of the rear wheels to the brake effect.

It has been found that this objective can be achieved by a circuit configuration of the afore-mentioned type having the special feature that, at a low friction coefficient, (i.e. at a coefficient lower than a threshold value), which is approximately identical on the right-hand and left-hand sides of the automotive vehicle, the brake pressures on the rear wheel brakes, upon commencement of a control process, are individually controlled, and that, after the first entrance of a rear wheel into a stable phase, there is a switch to the select-low control which, in the select-low control phase, if no instability occurs on the high-wheel, (i.e. on the non-selected rear wheel), during a predetermined period of time, will increase the brake pressure on this wheel by a fixed or variable value. Advantageously, the coefficient of friction is deemed to be low or is interpreted by the circuit logic as being low, once it is under a predetermined threshold value of between 0.2 and 0.35, preferably under 0.25.

According to an advantageous embodiment of the circuit configuration of the present invention, in the reacceleration phase of a rear wheel, the brake pressure build-up is initiated if the wheel speed falls below a predetermined slip threshold if, at the same time, the factual reacceleration is above a threshold value and if another threshold, derived from the maximum value of the filtered wheel acceleration, is exceeded. Due to the dependence on the filtered threshold value, mistaken reactions to defects, such as road unevenness, axle vibrations and the like, are eliminated.

In some cases, it is advantageous to the control if the threshold value, derived from the maximum value of the filtered wheel acceleration, is variable in response to the vehicle speed. With an increasing vehicle speed, the influence of the filtered wheel acceleration is reduced continuously or by increments to the deviation from the pure select-low control.

According to another embodiment of the present invention, the circuit configuration is so designed that the brake pressure delivery or the number and duration of pulses that determine the brake pressure build-up, is calculated from the brake pressure build-up and the brake pressure decrease in the preceding cycle, from the friction coefficient and from other quantities and data, and that the brake pressure delivered in the reacceleration phase represents a premature share of the calculated brake pressure. This is feasible if the brake pressure build-up is dimensioned or fixed by fixing the number and duration of pressure build-up pulses and if the premature brake pressure delivery is compensated by suppressing one or more pulses in the calculated pulse raster.

Moreover, according to another embodiment of the present invention, the premature brake pressure delivery is dimensioned in response to a predetermined nominal control frequency. An increase in the premature share of the brake pressure delivery, in this respect, will result in the locking threshold of the wheel being reached more rapidly, thus resulting in an increased control frequency. The circuit configuration according to the present invention, for that purpose, may be provided with a counter, the contents of which are evaluatable for determining the control frequency. The counter determines the number and/or the duration of the pressure build-up pulses, with the amount of the premature brake pressure delivery being varied in response to the pressure build-up pulses determined in the preceding cycle by the counter.

The circuit configuration of the present invention insures an approximately synchronous rotating pattern of the two rear wheels. The two rear wheels, alternately, are guided to the locking threshold and an optimally delivered brake pressure is applied to the wheels in accordance with the control frequency. At low friction coefficients, the contribution of the rear wheels to the deceleration is substantially increased compared to conventional select-low controls. While this applies to disc brakes, it applies, in particular, to drum brakes. The brake torque failures typical with drum brakes, during an anti-locking control, are decisively reduced. In particular, a substantial reduction in the stopping distance is attained at low friction coefficients.

Further features, advantages and fields of end-use application of the present invention will become apparent from the following description of additional details with reference to the drawings which illustrate one embodiment of the present invention.

DETAILED DESCRIPTION OF THE INVENTION

Figure 1:
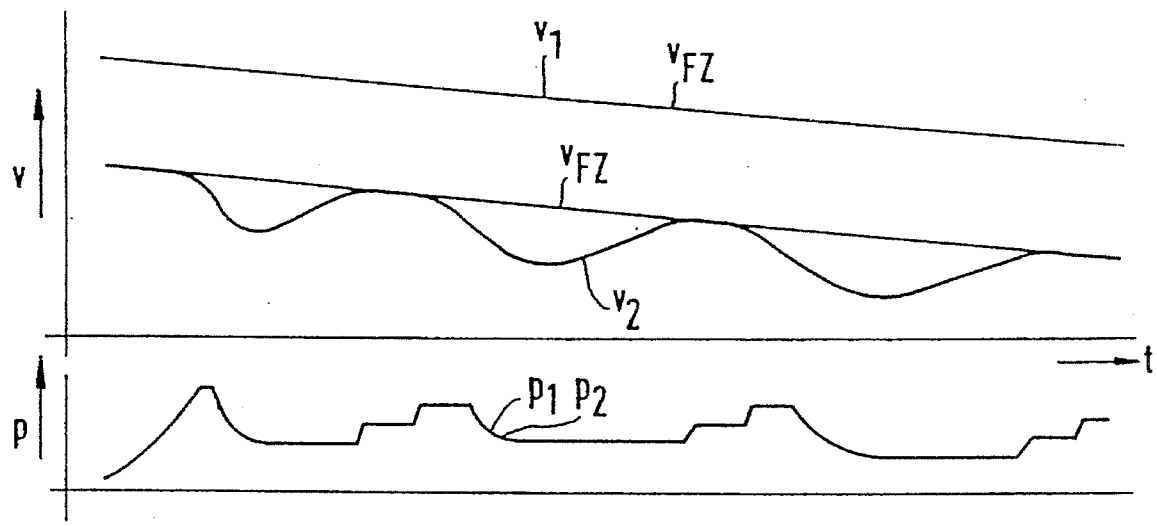
FIG. 1 shows curves of the speed pattern of the two rear wheels, as well as the brake pressure pattern, in a pure select-low control.

FIG. 1 shows a situation where a rear wheel which, in the present instance, is the rear wheel of the speed $v_2$ in a plurality of succeeding cycles, is at its stability threshold, while the second rear wheel of speed $v_1$ runs permanently stable and, consequently, will be braked at an excessively low rate. This is a pure select-low control in which the same brake pressure $p_1$, $p_2$ is applied to both rear wheels in response to the rotating pattern of the low-wheel. At a low friction coefficient, this could result in a substantial extension of the theoretically possible stopping distance because the second rear wheel of speed $v_1$ does not sufficiently contribute to the deceleration of the automotive vehicle. $v_{FZ}$ is the speed or the reference speed of the automotive vehicle.

Figure 2:
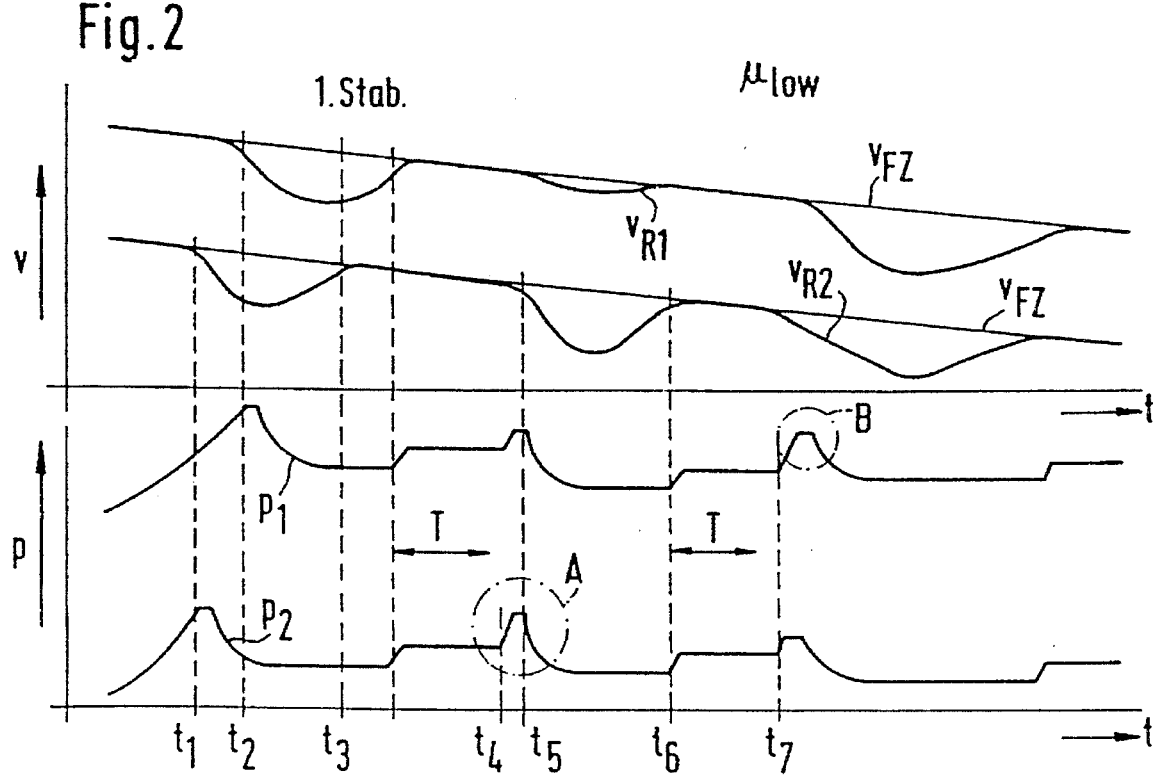
FIG. 2 is similar to FIG. 1, but with control due to the circuit configuration according to the present invention.

When using the circuit configuration according to the present invention, in a like situation as the one represented by FIG. 1, highest possible brake pressure is applied to both rear wheels resulting in the wheel pattern $v_{R1}$, $v_{R2}$ and a brake pressure pattern $p_1$, $p_2$ as shown in FIG. 2. The curves apply to a controlled braking operation at a low friction coefficient and homogenous conditions, (i.e. approximately identical friction coefficients on the right-hand side and on the left-hand side of the automotive vehicle. It is only under such conditions that, in deviation from a pure select-low control, upon commencement of a control operation, the brake pressure in both rear wheel brakes is individually controlled. In the present instance, the control will commence at the time $t_1$ on the rear wheel of speed $v_{R2}$. The brake pressure build-up $p_1$ is continued at time $t_2$ at which the second rear wheel also will become unstable. The individual control for both rear wheels will apply only until one of the two rear wheels enters into a stable control phase. In the example according to FIG. 2, this will be at time $t_3$ when the wheel of the speed $v_{R2}$ becomes stable. Thereafter, the select-low principle of control will apply to the end of the control operation which, normally, is composed of a plurality of control cycles. In the example as shown, at the time $t_3$, the rear wheel of the speed $v_{R1}$, will be the leading wheel, the rotating pattern of which determines the brake pressure. Approximately at time $t_5$, the lead will pass to the rear wheel of speed $v_{R2}$.

Another important feature of the control according to the present invention is that, after the first entrance of a rear wheel into the stable phase, (i.e. at the time $t_3$), the non-selected wheel, which, after time $t_3$, is the rear wheel of $v_{R2}$, is monitored to determine whether, within a predetermined period of time T of, for example, 100 to 140 ms, it again becomes unstable. If this does not occur, in the practice of the present invention, the brake pressure delivery, on that wheel, in the next pressure build-up phase as released by the selected wheel, compared to the brake pressure $p_1$ of the leading wheel, is increased by a predetermined fixed or variable amount. In FIG. 2, region A, in which the increase in the brake pressure occurs, is highlighted. For example, the pressure build-up pulse on wheel $v_{R2}$, released at time $t_4$, is extended or the number of pulses is increased. Due to this additional pressure delivery at time $t_5$, the delay threshold is, in fact, reached again and the pressure, released by the wheel now leading, is decreased. The operations described will be repeated. After the pressure delivery commencing at time $t_6$, at which the rear wheel $v_{R2}$ is leading, the predetermined period of time T, again, will lapse without the non-selected wheel becoming unstable, resulting in an increased pressure control B commencing at time $t_7$.

Figure 3:
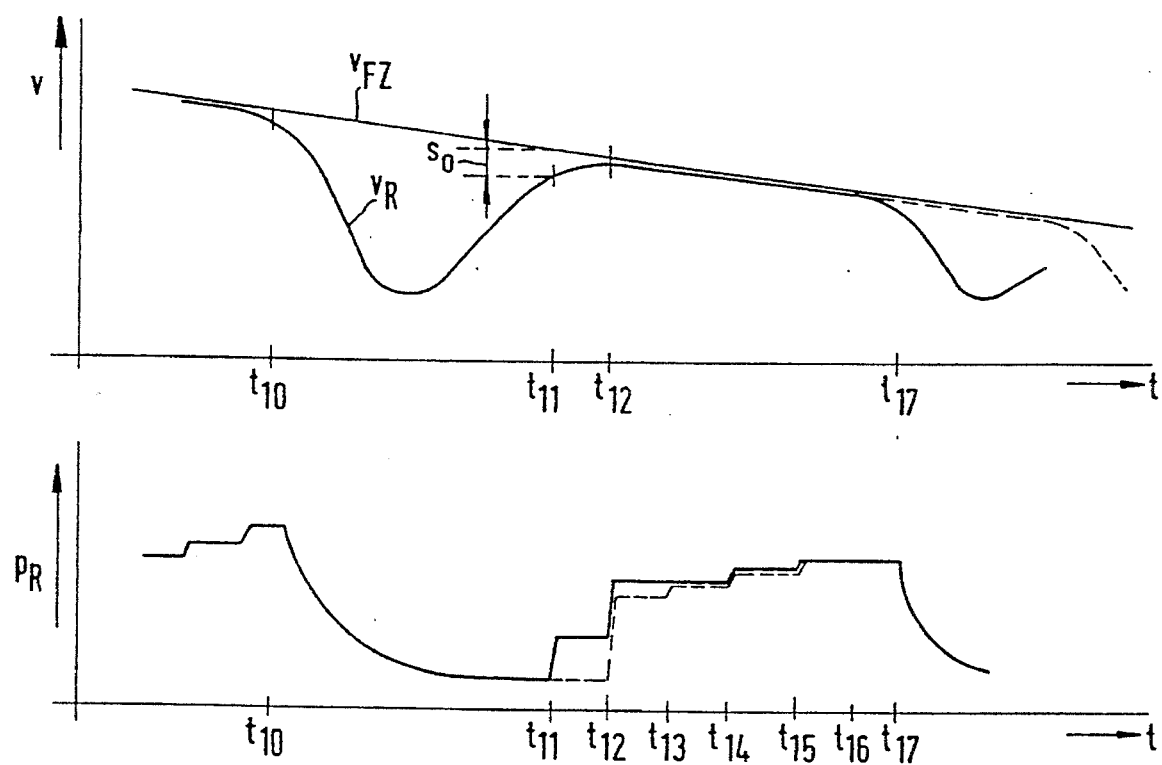
FIG. 3 shows curves of the wheel speed and the pressure in the associated wheel brake at a premature brake pressure delivery according to one embodiment of the present invention.

FIG. 3 serves to explain an embodiment of the present invention wherein, in addition to the measures as described, the pressure delivery to the rear wheel brakes is "premature" in terms of time, if predetermined conditions have been satisfied. This, too, will serve to enhance the brake effect of the rear wheel brakes and to permit the highest possible utilization thereof, without affecting the driving stability.

FIG. 3, again, shows the speed pattern $v_R$ of a rear wheel and the speed or the reference speed $v_{FZ}$ of the automobile. In the situation as shown, a control cycle will commence at time $t_{10}$. Approximately at time $t_{11}$, the wheel falls below a slip threshold and again enters into a stable phase. At the time $t_{12}$, the wheel again reaches the speed of the automobile. $t_{12}$ is the time when pressure is usually delivered anew or when the available brake pressure is increased to decelerate the automobile which, in part, is affected by this wheel. The pressure build-up is, as shown by pressure curve $p_R$ in FIG. 3, first with a steep pressure rise or pressure increase gradient, followed by a pressure build-up gradient which, in average, is flat. This pressure build-up, conventionally, is reached first by a slightly extended pressure build-up pulse which is released at the time $t_{12}$ and which is followed by a plurality of very short pressure build-up pulses at times $t_{13}$, $t_{14}$, $t_{15}$ with relatively extended pulse breaks. This conventional pressure build-up, commencing at time $t_{12}$, is shown by broken lines in FIG. 3 because, in the practice of the present invention, through a "premature" pressure build-up pulse, the pressure pattern, as shown by a solid line, is adjusted. Reference is made to a "premature" pressure build-up pulse because the renewed pressure build-up commences prior to re-entrance of the controlled wheel into the stable condition, (i.e. prior to time $t_{12}$). The release of a premature pressure build-up pulse requires that, at the critical time, which, in the present instance is time $t_{11}$, the rear wheel, the speed $v_R$ of which is illustrated, has fallen below a slip threshold and, consequently, has re-approached the speed $v_{FZ}$ of the automobile, or a reference speed. Moreover, a predetermined threshold of the reacceleration is required to have been exceeded at the time $_{11}$. Finally, the release of the premature pulse, in addition, depends on another threshold value being exceeded which is derived from the maximum value of the filtered wheel acceleration. Due to that measure, signals generated by road defects are distinguished from factual control signals. The threshold value, in the present embodiment of the invention, is dependent on the speed of the automotive vehicle. At a low speed, the threshold value is relatively high, decreasing at an increasing speed of the automotive vehicle, The amount of the premature pressure delivery is dependent on the pressure build-up in the preceding cycle as will be understood from the following description of one embodiment of the circuit configuration taken with reference to FIG. 4. For example, the pressure build-up pulses are determined by a counter, and in the subsequent cycle, the premature pressure delivery is varied in response to the counter contents. If a relatively large number of pressure build-up pulses were required before reaching the stability limit, in the subsequent cycle, the premature pressure delivery will be increased for better utilization of the braking capability of the wheel. Conversely, in the event of some minor counter contents, no brake pressure or only a low amount of brake pressure is prematurely delivered.

Moreover, it is understood from FIG. 3 that, for compensating the premature pressure delivery, one pulse (or several pulses) of the pressure build-up raster, following the region of the steep pressure buildup, will be suppressed. In FIG. 3, the pressure rise at the time $t_{13}$ is eliminated compared to the original build-up raster shown by broken lines.

The premature pressure delivery in response to the counter contents and, optionally, additional quantities, for an optimum adjustment of the control frequency applies to both rear wheels. The increase in the pressure delivery to the wheel brake of the high-wheel, as described with reference to FIG. 2, if after lapse of the predetermined period of time T the high-wheel still runs stable, can, of course, be incorporated into the calculation of the premature pressure build-up pulse.

Figure 4:
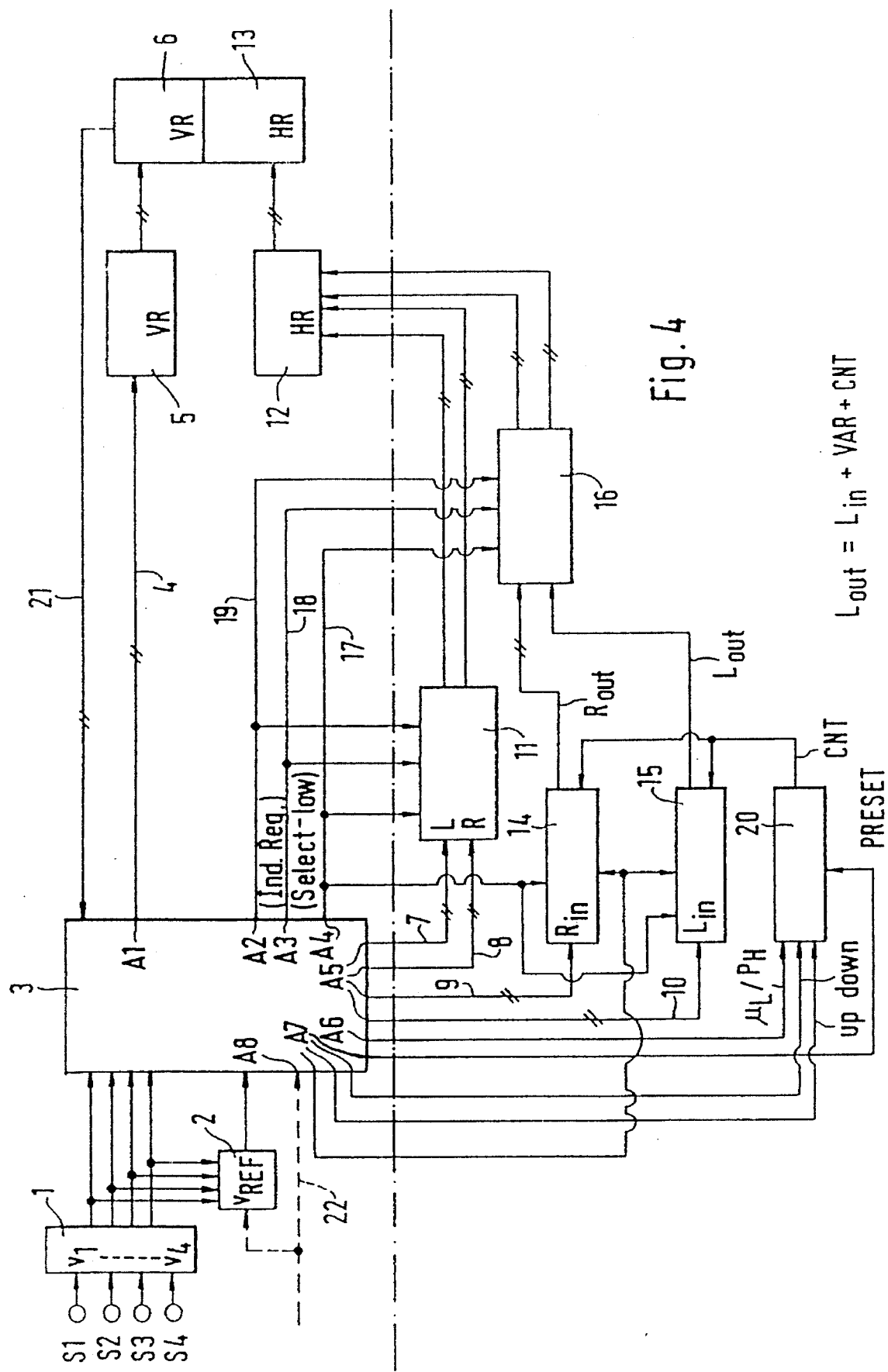
FIG. 4 is a block diagram showing, in simplified form, the major components of a circuit configuration according to the present invention.

The circuit configuration according to the present invention, as shown in FIG. 4, includes, above the dash-dotted line, the components of a previously used control circuit. The components shown below the dash-dotted line substantially provide the modification of the pressure build-up control according to the present invention.

The circuit configuration as shown in FIG. 4 includes a circuit 1 for processing the signals supplied by individual wheel sensors S1 to S4 and representing the rotating pattern of the individual wheels. The output signals of the processing circuit 1 are supplied to a logic circuit 3 which generates, from the sensor signals and from a reference speed signal $v_{REF}$ which is representative of the speed of the automotive vehicle and generated from the sensor signals in a circuit 2, the actual valve actuating signals or a pre-stage of such signals. The brake pressure in the individual wheel brakes is then controlled by such valves in a manner that no locking occurs and a deceleration of the vehicle with a stopping distanced as short as possible, is attained.

According to FIG. 4, an output A1 of the logic circuit 3, through a multiple conduit 4, is in communication with a valve control circuit or a "valve actuator" 5 for the front wheels which directly actuates the hydraulic valves 6 for the modulation of the brake pressure on the front wheels. Connected to the corresponding output A5 of the logic circuit 3 and supplying the signals for modulating the brake pressure in the rear wheel brakes, are signal conduits 7, 8 for the pressure decrease control and signal conduits 9, 10 for the pressure build-up control, with 8, 9 being associated with the right-hand rear wheel and 7, 10 with the left-hand rear wheel. The pressure decrease conduits 7, 8 lead to a valve actuating circuit 12 for the rear wheels via a multiplex or selector switch 11. The output signals of valve actuating circuit 12 control brake valves 13 of the rear axle.

The pressure build-up control paths 9, 10, through adders (and subtractors) 14, 15 are in communication with a multiplex or selector switch 16, the outputs of which lead to the valve actuator circuit 12 for the rear wheels. The multiplex switches 11, 16 permit either an individual excitation of the rear wheel valves or a synchronous brake pressure control in response to the momentarily leading right-hand or left-hand wheel in the select-low operation. Accordingly, provided for the control of the multiplex switches 11, 16 and the set-up of the switch paths are the outputs A2, A3, A4 of the logic circuit 3 and the connecting conduits 17, 18, 19, through which the logic circuit 3 reports to the multiplex switches 11, 16 whether "select-low" operation (via conduit 17) or "individual control" (via conduit 18) is performed, and whether, upon commencement of a control, a first entrance of a rear wheel into a stable phase (via conduit 19) has been detected.

A counter 20, through another multiple output A7 of the logic circuit 3, is reset (PRESET), upset (UP) or downset (DOWN) to detect the number and, optionally, also the duration of the pressure build-up pulses for the accurate and sensitive dimensioning of the premature pressure delivery in the subsequent cycle. However, the pressure build-up pulses on the rear axle will be detected by counter 20 only if a low friction coefficient, for example, a friction coefficient under $\mu=0.25$, has been determined and reported to counter 20 through output A6. The reset signal (PRESET) is released, for example, upon commencement of a control. If the control frequency is below a predetermined-optimum value, the counter is set up (UP), whereas it is set down (DOWN), if the control frequency is higher than the optimum value.

The initial value CNT of the counters representing the counter contents, is reported to the two adders 14, 15. Moreover, these adders are informed, through a connection (VAR), of the duration of the stable phase of the guided rear wheel (high-wheel) determined in the logic circuit 3. With the aid of the adders 14, 15, the pressure delivery to the wheel brake of the high-wheel is increased, in the manner described in connection with FIG. 2, once the stable phase of this wheel exceeds the predetermined duration T. The adder 14 fulfills this function for the right-hand rear wheel, while the adder 15 fulfills this function for the left-hand rear wheel. The sum formed in the individual adders 14, 15, that is analyzed through the multiplex switch 16 for the control of the pressure build-up on the rear wheels, hence, is composed of the input value supplied by the logic circuit 3, a VAR-share and the contents of the counter 20.

The excitation of the valves 6, 13, moreover, is reported to the logic circuit 3 through a multiple conduit 21.

Another input A8 to the logic circuit 3, to which a signal conduit 22 (shown in broken lines) leads, serves for the connection of additional sensors or signals, such as an automobile acceleration sensor.

The operation of the circuit configuration of FIG. 4 has already been described with reference to FIG. 2 and FIG. 3. In lieu of the circuit as shown, the processes as described can also be performed by a program-controlled circuit, such as a microcomputer.

We claim:

1. A circuit configuration for a brake system of an automotive vehicle, comprising an electronic anti-locking control for the regulation of the brake pressure build-up on the rear wheels during a controlled braking operation, by means of which, through the logical operation of signals mirroring at least one of the rotating pattern of the individual vehicle wheels and the driving pattern of the automobile, a friction coefficient is permanently determined and the brake pressure on the rear wheels, in "normal operation" is controlled according to the select-low control principle, characterized in that circuits are provided which, at a low friction coefficient which is lower than a threshold and which is approximately identical on the right-hand and left-hand sides of the automobile, individually control the brake pressure on the rear wheel brakes upon commencement of a control operation, which, after the first entrance of a rear wheel into a stable phase switch to the select-low control and which, in the select-low control phase, if no instability occurs on the high-wheel during a predetermined spell of time, increase the brake pressure on the said wheel by a fixed or variable amount.

2. A circuit configuration according to claim 1, characterized in that a friction value or friction coefficient below a predetermined threshold which is between 0.2 and 0.35 is considered low.

3. A circuit configuration according to claim 2, characterized in that, if no instability occurs on the high-wheel, the predetermined period of time after which the brake pressure is increased is between 80 and 200 ms.

4. A circuit configuration according to claim 2, characterized in that the friction value or friction coefficient below said predetermined threshold which is under 0.25 is considered low.

5. A circuit configuration according to claim 3, characterized in that, in the reacceleration phase of one of said rear wheels, a brake pressure build-up is initiated if the wheel speed falls below a slip threshold if, at the same time, the actual reacceleration is above a threshold value and if another threshold value derived from the maximum value of the filtered wheel acceleration is exceeded.

6. A circuit configuration according to claim 3, characterized in that, if no instability occurs on the high-wheel, the predetermined period of time after which the brake pressure is increased is between 100 and 150 ms.

7. A circuit configuration according to claim 5, characterized in that the threshold value derived from the maximum value of the filtered wheel acceleration, in response to the vehicle speed is variable.

8. A circuit configuration according to claim 7, characterized in that the brake pressure delivery and the number and duration of pulses, respectively, that determine the brake pressure build-up are calculated from the brake pressure rise and the brake pressure decrease in the preceding cycle, from the friction coefficient and from other measured quantities and data, and that the brake pressure delivered into the reacceleration phase represents a premature share of the said calculated brake pressure.

9. A circuit configuration according to claim 8, characterized in that the brake pressure build-up is dimensioned by fixing the number and duration of pressure build-up pulses, and that the premature brake pressure delivery is compensated by suppressing one or more pulses the calculated pulse raster.

10. A circuit configuration according to claim 9, characterized in that the premature brake pressure delivery is dimensioned in response to a predetermined nominal control frequency.

11. A circuit configuration according to claim 10, characterized in that a counter is provided the contents of which are evaluable for determining the control frequency.

12. A circuit configuration according to claim 11, characterized in that the counter detects at least one of the number and the duration of brake pressure build-up pulses, and that the amount of the premature brake pressure delivery is dimensioned in response to the brake pressure build-up pulses detected in the preceding cycle by counter.

13. A circuit configuration according to claim 1, characterized in that the high wheel is the non-selected rear wheel.

14. A circuit configuration for a brake system of an automotive vehicle having front wheels and rear wheels, said circuit configuration comprising:

sensing means for developing first signals representative of the rotating pattern of the individual wheels of the automotive vehicle and second signals representative of the driving pattern of the automotive vehicle;

and control means for:
(a) setting a friction coefficient threshold,
(b) determining, from said first signals and said second signals, actual friction coefficients,
(c) controlling the brake pressures on wheel brakes associated with the rear wheels of the automotive vehicle during normal operation of the wheel brakes according to the rotating pattern of that wheel having the lower friction coefficent, and
(d) individually controlling the brake pressures on the wheel brakes associated with the rear wheels of the automotive vehicle upon commencement of a control operation at: (i) an actual friction coefficient lower than said friction coefficient threshold, and (ii) approximately identical friction coefficients on the right-hand and left-hand sides of the automotive vehicle by:
(1) switching to control according to the rotating pattern of that wheel having the lower friction coefficent after a first entrance of one of the rear wheels of the automotive vehicle into a stable phase, and (2) increasing, during control according to the rotating pattern of that wheel having the lower friction coefficient, the brake pressure on the wheel brake associated with the other rear wheel if no instability occurs on the other rear wheel during a predetermined period of time.

15. A circuit configuration according to claim 14 wherein the increase in the brake pressure on the wheel brake associated with that wheel having the lower friction coefficent is a fixed amount.

16. A circuit configuration according to claim 14 wherein the increase in the brake pressure on the wheel brake associated with that wheel having the lower friction coefficent is a variable amount.

17. A circuit configuration according to claim 14 wherein said friction coefficient threshold is between 0.2 and 0.35.

18. A circuit configuration according to claim 17 wherein said friction coefficient threshold is 0.25.

19. A circuit configuration according to claim 14 wherein, if no instability occurs on the other rear wheel, said predetermined period of time after which the brake pressure is increased is between 80 and 200 ms.

20. A circuit configuration according to claim 19 wherein, if no instability occurs on the other rear wheel, said predetermined period of time after which the brake pressure is increased is between 100 and 150 ms.

21. A circuit configuration according to claim 14 wherein said control means also:

(a) set a slip threshold, (b) set a reacceleration threshold, (c) set a threshold derived from the maximum value of the filtered wheel accelerations and (d) initiate pressure build-up in the wheel brakes associated with the rear wheels of the automotive vehicle during reacceleration of a rear wheel if:

(1) the wheel speed of the rear wheel falls below said slip threshold, (2) the actual reacceleration is above said reacceleration threshold, and (3) said threshold derived from the maximum value of the filtered wheel acceleration is exceeded.

22. A circuit configuration according to claim 21 wherein said threshold derived from the maximum value of the filtered wheel acceleration, in response to the vehicle speed, is variable.

23. A circuit configuration according to claim 22 wherein:

(a) said brake pressure build-up is dependent upon brake pressure delivery and the number and duration of brake pressure pulses which are determined from at least: (i) the brake pressure rise and the brake pressure decrease in the preceding cycled and (ii) the friction coefficient, and (b) brake pressure delivered during reacceleration phase represents a premature share of the said determined brake pressure.

24. A circuit configuration according to claim 23 wherein the premature brake pressure delivery is dimensioned in response to a predetermined nominal control frequency.

25. A circuit configuration according to claim 24 wherein said control means include a counter, the contents of which determine said control frequency.

26. A circuit configuration according to claim 25 wherein said counter detects at least one of:

(a) the number of brake pressure build-up pulses, and (b) the duration of brake pressure build-up pulses, and the amount of the premature brake pressure delivery is dimensioned in response to the brake pressure build-up pulses detected in the preceding cycle by counter.

27. A circuit configuration according to claim 22 wherein said brake pressure build-up is dimensioned by fixing the number and duration of pressure build-up pulses, and the premature brake pressure delivery is compensated by suppressing one or more pulses in the calculated pulse raster.

* * * * *

UNITED STATES PATENT AND TRADEMARK OFFICE
CERTIFICATE OF CORRECTION

PATENT NO.   : 5,452,947
DATED        : September 26, 1995
INVENTOR(S)  : Ehmer et al.

It is certified that error appears in the above-identified patent and that said Letters Patent is hereby corrected as shown below:

In column 8, claim 9, line 25, insert "in" between "one or more pulses" and "the calculated pulse"

In column 10, claim 23, line 15, delete "cycled" and substitute therefor --cycle--

Signed and Sealed this

Second Day of January, 1996

Attest:

BRUCE LEHMAN

*Attesting Officer*   *Commissioner of Patents and Trademarks*